Sept. 27, 1966 P. M. ROCHER ETAL 3,274,885
INSTRUMENTS FOR CHECKING CORNEAL LENSES
Filed Nov. 30, 1962 2 Sheets-Sheet 1

INVENTORS
PIERRE MICHEL ROCHER
CLAUDE GABRIEL THOMAS
By Young & Thompson
ATTYS.

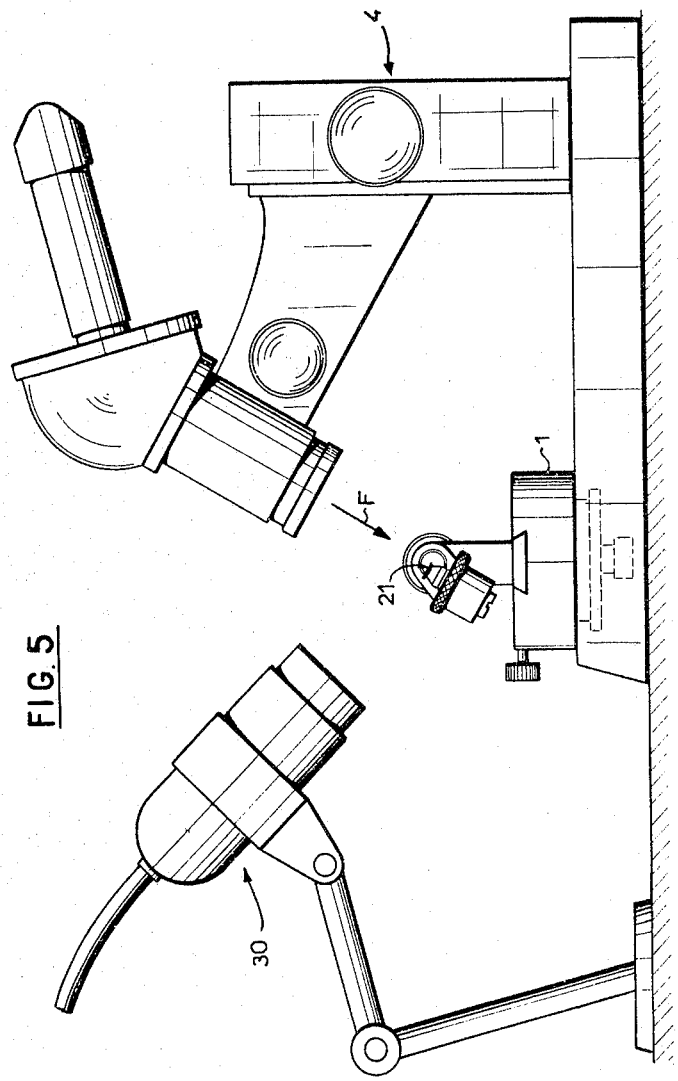

United States Patent Office 3,274,885
Patented Sept. 27, 1966

3,274,885
INSTRUMENTS FOR CHECKING CORNEAL LENSES
Pierre Michel Rocher and Claude Gabriel Thomas, Saint-Maur, France, assignors to Lentilles Ophtalmiques Rationnelles, Paris, France, a corporation of France
Filed Nov. 30, 1962, Ser. No. 241,374
Claims priority, application France, Jan. 9, 1962, 884,261
1 Claim. (Cl. 88—56)

This invention relates to instruments for checking corneal lenses by permitting the rim of a corneal lens to be observed with a low power microscope.

It is known the slightest roughness at the rim of a corneal lens involves the risk of causing lesions on the user's cornea, and that a corneal lens cannot be tolerated for long periods unless its rim fulfils certain essential conditions of profile and finish.

Painstaking checking of the rim of each lens is thus an absolute necessity, and the present invention has as its main object the provision of an instrument which is strong and simple and facilitates said rim checking operation.

According to the invention an instrument for checking corneal lenses by permitting the rim of a corneal lens to be observed with a low power microscope comprises a support adapted to be secured to the stand of a low power microscope, a member on said support which member is movable about a horizontal axis and a lens carrier mounted for rotation on said member about an axis perpendicular to said horizontal axis, said carrier being adapted to receive a lens to be observed in such a manner that the optical axis of the lens coincides with the axis of the carrier, whereas the distance separating the axes of rotation of said member and said carrier is substantially equal to half the diameter of the lens to be observed, the height of said carrier being determined so that the axis of rotation of the movable member intersects the rim of a lens in position on the carrier, the height of said carrier being determined so that the axis of rotation of the movable member intersects the rim of the lens in position on its carrier.

By means of this arrangement, with the observation microscope focussed on the point of intersection of the axis of rotation of the movable member and the rim of the lens, a simple rotation of the carrier makes it possible to observe the whole of the periphery of the lens, whereas a simple tilting (or pivoting) of the movable member allows complete examination of said rim along a given meridian line.

Figure 1:
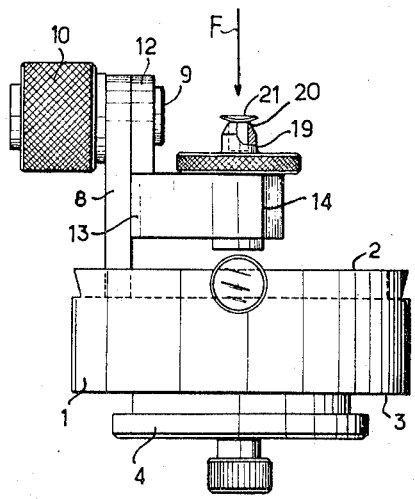
Figure 2:
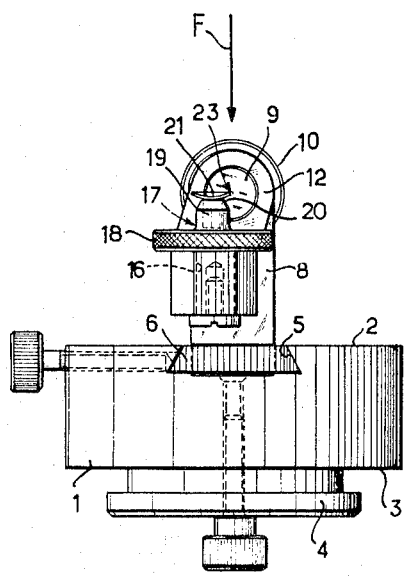
Figure 3:
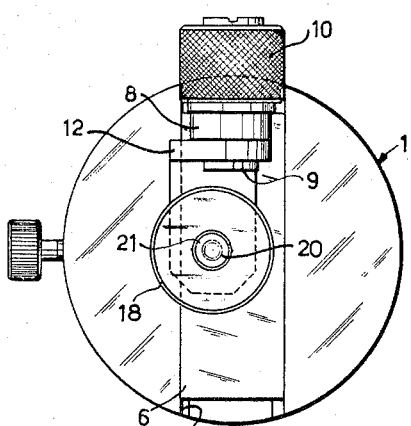
Figure 4:
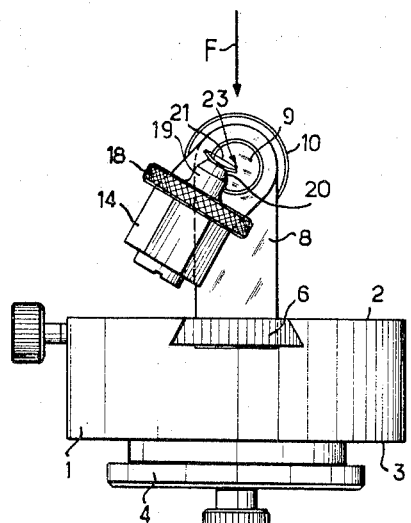

In order that the invention may be more clearly understood an embodiment thereof will now be described, by way of example, with reference to the accompanying drawings, in which:

FIGURE 1 is an elevation of an instrument according to the invention for checking corneal lenses,
FIGURE 2 is a front view of the instrument,
FIGURE 3 is a plan view of the instrument,
FIGURE 4 is another front view of this instrument, the lens carrier having been given a different orientation from its orientation in FIGURE 1, and
FIGURE 5 is a diagrammatic view showing an instrument according to the invention mounted on the stand of an observation microscope, in conjunction with a lighting appliance.

In the embodiment illustrated an instrument according to the invention for checking corneal lenses comprises a steel support 1 having the form of a cylinder delimited by two plane horizontal faces 2 and 3, the lower face 3 carrying means for attaching the support to a frame or to the stage of an observation microscope 4, as in FIGURE 5. In the upper face 2 of the support 1 there is formed a milled dovetail groove 5 forming a slide for a carriage 6. To said carriage is secured an upright post 8 traversed by a horizontal pin 9, one end of which is formed with a knurled control knob 10 and the other end of which is secured to a vertical arm 12 of a member 13 in the form of an angle bracket whose other arm 14 is horizontal.

In said arm 14 there is formed a bore 16 in which is housed the cylindrical shank of a member 17 carrying the lens which is to be checked.

The member 17 has a finger grip 18 with a diameter greater than the width of the section 14, the circumference of said grip being knurled to allow manipulation, and the member 17 being extended by a cylindrical top 19 whose extremity forms a cup 20 adapted to receive the convex face of a lens 21 which is to be checked.

In order to hold the lens, the cup 20 is filled with water, and the very light lens 21 is held in place solely by means of the adhesion of the water.

The lens which is to be checked is placed on the top 19 in such manner that the axis of rotation of the member 17 coincides with the optical axis of the lens.

According to an essential feature of the invention, the instrument is formed in such manner that the axis of rotation of the angle bracket 13, that is to say the axis of the pin 9, indicated at 23, intersects the rim of the lens 21 placed in position as hereinabove specified on the top 19.

In this manner, observation occurs in the direction of the arrow F by means of the microscope 4 associated with a lighting appliance 30, and focussed on the rim of the lens 21, the rotation of the member 17 manipulated by means of the grip 18 making it possible to observe the rim of the lens along the entire periphery of said lens. In addition, by tilting the angle bracket 13 about the axis 23, the entire rim may be observed along a selected meridian line of the lens, determined by the rotation of the member 17.

The rim of the lens being positioned on the axis of rotation 23 of the angle bracket, the distance of observation varies very little during said tilting of the angle bracket, and if the magnification set for the microscope is not too great, the rim remains constantly within the field of focus of the microscope.

This instrument allows convenient and rapid observation of the condition of the finish of the rim of a corneal lens. This instrument may be easily adapted to check lenses of different diameters by simple modification of the distance separating the axis of the lens-carrying member 17 from the axis of rotation 23 of the angle bracket.

The lens carrier my be modified. For example the lens may be held in position by pneumatic suction exerted on one face of said lens.

What we claim is:

For use with a microscope having a viewing axis, an instrument for checking corneal lenses by permitting the rim of a corneal lens to be observed with said microscope, said instrument comprising a support, a member mounted on said support for movement about a first axis, a lens carrier mounted for rotation on and relative to said member about a second axis perpendicular to said first axis, said carrier being adapted to support thereon a lens to be observed in such a manner that the optical axis of the lens coincides with said second axis, said first and second axes being spaced apart a distance substantially equal to half the diameter of the lens to be observed, the height of said carrier being such that first axis intersects the rim of a lens in position on the carrier, and said first and second axes being positioned so that said first axis intersects and is perpendicular to said viewing axis of a said microscope and said second axis is swingable about said first axis in a plane which includes said viewing axis of said microscope.

References Cited by the Examiner

UNITED STATES PATENTS

| | | | |
|---|---|---|---|
| 2,533,747 | 12/1950 | Thienemann | 88—39 |
| 2,539,597 | 1/1951 | Staples | 88—14 X |
| 2,765,704 | 10/1956 | Mottu | 88—24 |
| 3,019,708 | 2/1962 | French et al. | 88—56 X |
| 3,027,804 | 4/1962 | Wesley et al. | 88—56 |
| 3,068,750 | 12/1962 | Faulkner | 88—56 |

JEWELL H. PEDERSEN, *Primary Examiner.*

D. R. STEVENS, F. SHOON, *Assistant Examiners.*